United States Patent
Arai et al.

(10) Patent No.: US 6,287,058 B1
(45) Date of Patent: Sep. 11, 2001

(54) CUTTING TOOL AND METHOD FOR SUPPLYING CUTTING MEDIUM TO THE SAME

(75) Inventors: Tatsuo Arai; Hiroshi Shimomura, both of Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/306,795

(22) Filed: May 7, 1999

(30) Foreign Application Priority Data

| May 7, 1998 | (JP) | 10-125031 |
| Jun. 16, 1998 | (JP) | 10-168937 |
| Jun. 16, 1998 | (JP) | 10-168938 |

(51) Int. Cl.⁷ ............... B23C 5/28; B23Q 11/10
(52) U.S. Cl. ............ 409/132; 409/136; 409/137; 408/56; 408/61
(58) Field of Search ............ 408/56, 61, 57, 408/59, 67, 16, 112; 409/132, 136, 135, 137, 131; 407/33, 34, 35, 1, 2, 3, 53, 51, 54, 120, 115, 11; 144/251 R, 252 R

(56) References Cited

U.S. PATENT DOCUMENTS

| 3,062,454 | 11/1962 | Cocks . | |
| 4,037,982 | * 7/1977 | Clement | 409/137 |
| 4,210,544 | * 7/1980 | Burton et al. | 252/47.5 |
| 4,458,494 | * 7/1984 | Fekete | 62/5 |
| 4,563,115 | 1/1986 | Abe et al. . | |
| 4,597,697 | * 7/1986 | Shaffer | 408/61 |
| 4,789,273 | * 12/1988 | Wiacek et al. | 407/34 |
| 4,919,232 | * 4/1990 | Lofton | 407/11 |
| 4,961,359 | * 10/1990 | Dunham | 83/169 |
| 5,017,060 | 5/1991 | Shiratori et al. . | |
| 5,026,221 | 6/1991 | Arai et al. . | |
| 5,072,613 | 12/1991 | Baer et al. . | |
| 5,090,849 | 2/1992 | Arai et al. . | |
| 5,290,135 | * 3/1994 | Ball et al. | 409/136 |
| 5,299,894 | * 4/1994 | McCowin | 408/61 |
| 5,332,341 | 7/1994 | Arai et al. . | |
| 5,332,343 | * 7/1994 | Watanabe et al. | 409/136 |
| 5,451,122 | * 9/1995 | Noda et al. | 409/137 |
| 5,487,629 | 1/1996 | Watanabe . | |
| 5,678,466 | * 10/1997 | Wahl | 409/136 |
| 5,791,842 | 8/1998 | Sugata . | |
| 6,036,412 | * 3/2000 | Dalla | 409/137 |

FOREIGN PATENT DOCUMENTS

| 42 44 026 A1 | 6/1994 | (DE) . |
| 0 397 193 | 11/1990 | (EP) . |
| 0 407 836 | 1/1991 | (EP) . |
| 0 667 209 | 8/1995 | (EP) . |
| 667849 | 10/1929 | (FR) . |
| 56-157834 | 12/1981 | (JP) . |
| 362223406A | * 10/1987 | (JP) . |
| 404322943A | * 11/1992 | (JP) . |
| 8-66816 | 3/1996 | (JP) . |
| 10-113839 | 5/1998 | (JP) . |
| 10-235534 | 9/1998 | (JP) . |
| WO95/17992 | 7/1995 | (WO) . |

OTHER PUBLICATIONS

Database WPI; abstract Section EI, Week 198148, Derwent Publications Ltd., London, GB; (Gorki Cons Tech Ins), Feb. 23, 1981.

* cited by examiner

*Primary Examiner*—Steven C. Bishop
(74) *Attorney, Agent, or Firm*—Oblon, Spivak, McClelland, Maier & Neustadt, P.C.

(57) ABSTRACT

A cutting tool for a machine tool including a tool body, at least one cutting edge and a cutting medium supplier. The tool body has one and another end portions along an axis thereof and is configured to be attached to a machine tool at the another end portions to be rotatable. At least one cutting edge is provided on the one end portion of the tool body. The cutting medium supplier supplies an atomized cutting fluid or a chilled gas to a place where a work is cut by the cutting edge.

21 Claims, 13 Drawing Sheets

CUTTING TOOL AND METHOD FOR SUPPLYING CUTTING MEDIUM TO THE SAME

BACKGROUND OF THE INVENTION

1. Field of the Invention

The present invention relates to a cutting tool having at least one cutting edge and a method for supplying a cutting medium to a place where a work is cut by the cutting edge.

2. Discussion of the Background

A face milling cutter, as an example of cutting tools of the type having cutting edges provided on a tool body, has been known as disclosed in Japanese Unexamined Patent Application Publication No. 3-281114.

As seen from FIG. 16, this face milling cutter 1 has a tool body 2 and a plurality of cutting tips 3 attached to an end of the tool body 2 around its circumference at a predetermined interval. Guide members 4 guide shavings or metal chips generated as a result of a cutting. The guide members 4 are attached to the tool body 2 and each guide member faces the rake surface of the end cutting edge and outer peripheral cutting edge on the respective cutting tip 3. At the same time, a substantially cylindrical member 5 serves as a receiver for receiving the chips and is provided coaxially with the tool body 2. Chip receiving spaces 6 are formed between the inner peripheral surface of the chip receiver 5 and the outer peripheral surface of the tool body 2, and the tool body 2 is rotatable relatively with respect to the chip receiver 5.

In operation of the face milling cutter 1, chips generated by the end cutting edge and outer peripheral edge on each tip 3 are forcibly hurled into the chip receiver 5 via the gap formed between the chip guide member 4 and the rake surfaces of the tip 3. The chips are then urged towards the inner peripheral surface of the chip receiver 5 and expelled through a discharge port 7 so as to be collected in, for example, a collecting box which is not shown.

This arrangement serves to prevent the uncontrolled scattering of the chips, thus, contributing to an improvement in the working environment. Also, it prevents breakage of the cutting tool and damage to a workpiece surface since these problems tend to occur due to jamming of chips between the cutting edges and a workpiece.

The purposes of supplying a cutting oil are lubrication of the rake surface and relief surface of the tip, cooling of the tool and a workpiece, removal of stagnant fine chips, and protection and rust-prevention of the finished surface of a workpiece.

Hitherto, due to the use of a cutting oil in a liquid phase, there have been problems such as impairment of the working environment caused by scattering of the cutting oil, necessity of costly disposal of waste oil and so on.

The cutting oil in a liquid state is supplied inside the chip receiver 5 externally through a hose or the like. This involves a risk that the tips of the cutting tool and the surface of a workpiece are not steadily supplied with the cutting oil since these parts are encased inside the chip receiver 5.

SUMMARY OF THE INVENTION

A first object of the present invention is to provide a cutting tool for a machine tool by which the amount of wasted cutting fluid is reduced. A second object of the present invention is to provide a cutting medium supplier for a cutting tool by which the amount of wasted cutting fluid is reduced. A third object of the present invention is to provide a method for supplying a cutting medium in a machine tool by which the amount of wasted cutting fluid is reduced.

The first object is achieved according to the present invention by providing a new cutting tool including a tool body, at least one cutting edge and a cutting medium supplier. The tool body has one and another end portions along an axis thereof and is configured to be attached to a machine tool at the another end portion to be rotatable. At least one cutting edge is provided on the one end portion of the tool body. The cutting medium supplier supplies an atomized cutting fluid or a chilled gas to a place where a work is cut by the cutting edge.

The second object is achieved according to the present invention by providing a new cutting medium supplier including a cutting medium supply mechanism which supplies an atomized cutting fluid or a chilled gas to a place where a work is cut by the cutting edge.

The third object is achieved according to the present invention by providing a new method for supplying a cutting medium in a machine tool having at least one cutting edge. In the method, an atomized cutting medium or a chilled gas is supplied to a place where a work is cut by the cutting edge.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DESCRIPTION OF THE PREFERRED EMBODIMENTS

A description will now be given of a face milling cutter in accordance with a first embodiment of the present invention, with specific reference to FIGS. 1 to 3.

Figure 2:
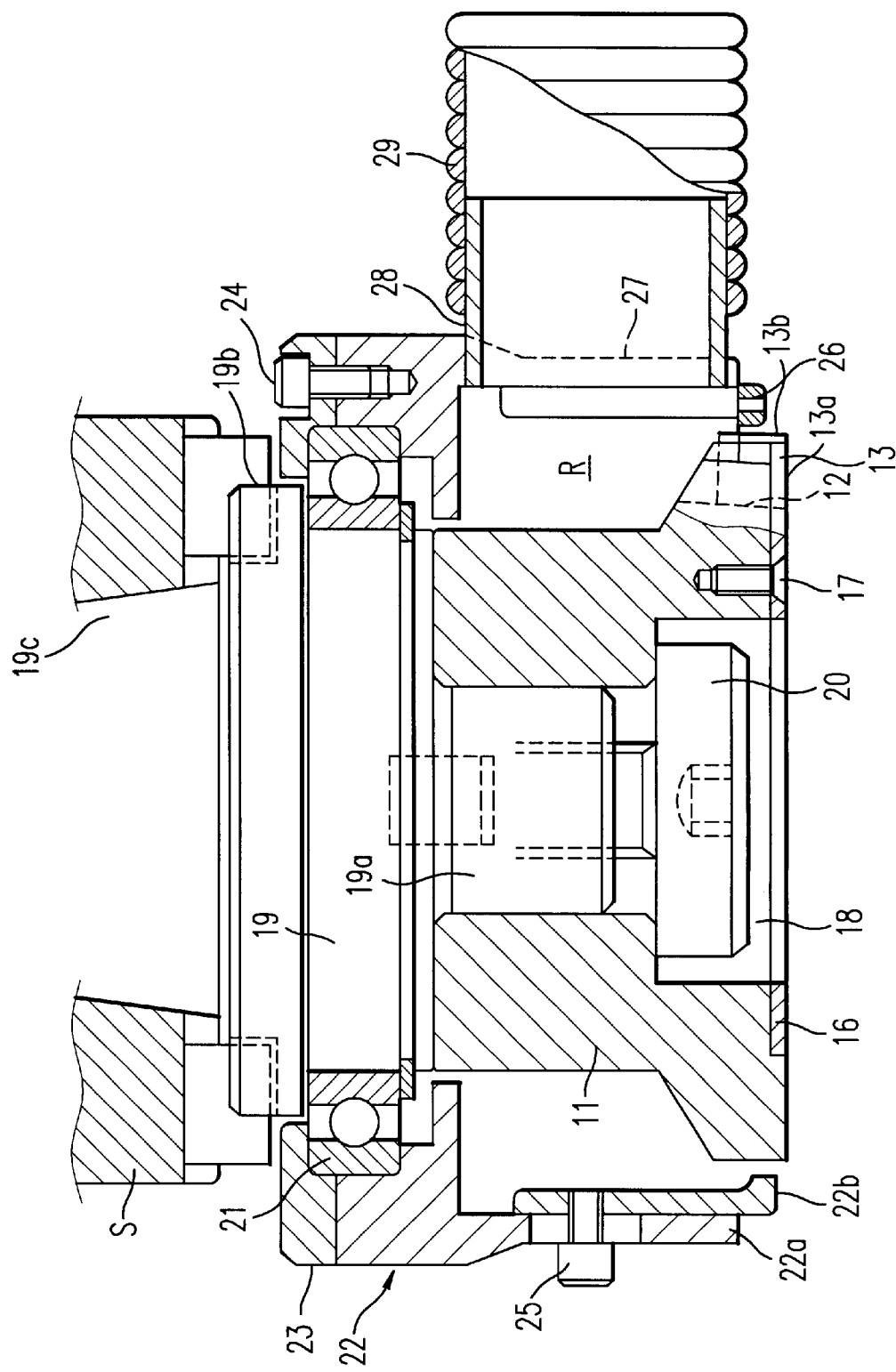
FIG. 2 is a longitudinal sectional view of the face milling cutter of FIG. 1, showing the entirety of the cutter.
Figure 3:
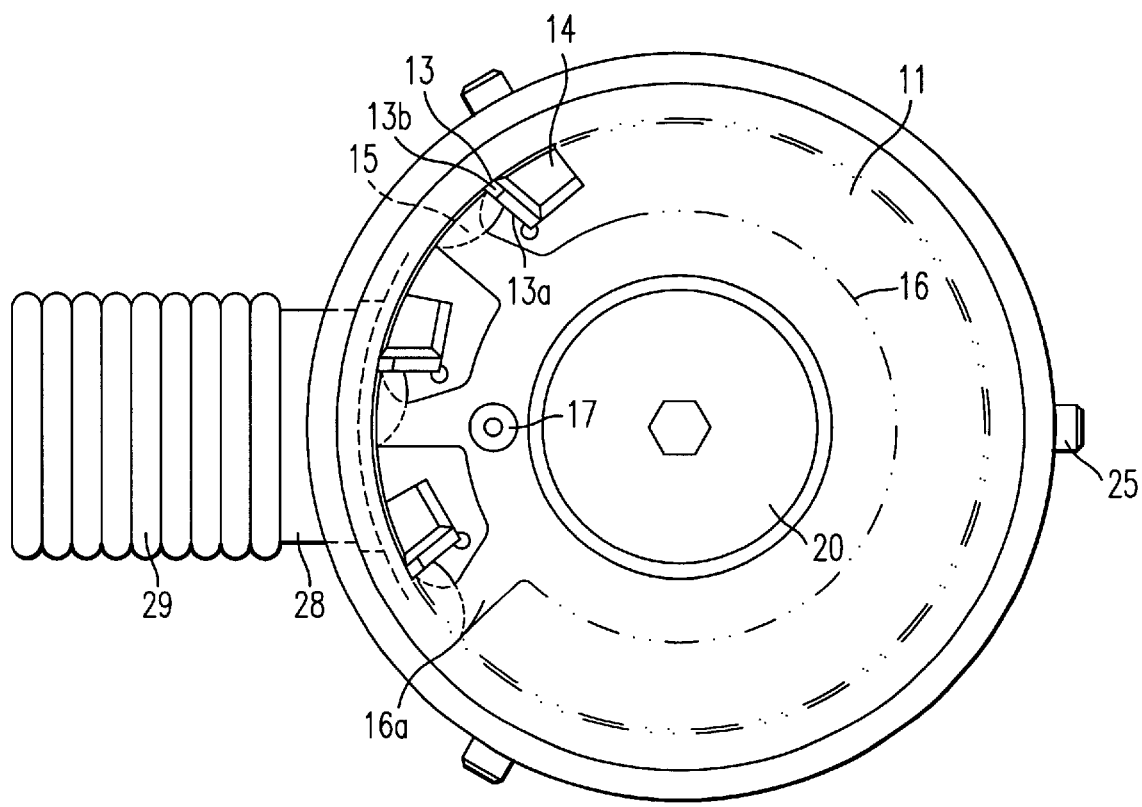
FIG. 3 is an end view of the face milling cutter shown in FIG. 1.

Referring to FIGS. 2 and 3, a tool body 11 has a generally cylindrical form with a reduced-diameter end. Tip-mounting seats 12 are formed in the outer peripheral edge at an axial end of the tool body 11. The plurality of tip-mounting seats 12 is arranged at a predetermined circumferential pitch and each of the tip mounting seats is opened in the radial as well as axial directions of the tool body.

A replaceable tip (referred to simply as a "tip", hereinafter) 13 is detachably seated on and fixed to each tip-mounting seat 12 by means of a clamping mechanism 14. A face cutting edge 13a is formed on a ridge of the tip 13 projecting from the end of the tool body 11, while an outer peripheral cutting edge 13b is formed on a ridge of the tip 13 projecting beyond the outer peripheral end of the tool body 11. In FIG. 3, tip pockets 15 are formed at an axial end of the tool body 11 around its outer peripheral edge and each tip pocket 15 is positioned just ahead of its respective tip 13 in the rotational direction of the tool body 11. The tip pockets 15 have the shape of a recess opening in an arcuate form and are opened in the radial as well as axial directions of the tool body 11.

A chip guide member 16 is embedded in the bottom of the tool body 11 and is fixed thereto by means of countersunk screws 17. The chip guide member 16 guides chips generated by the cutting edges 13a, 13b into chip reservoir spaces which will be described later. The chip guide member 16 has a flat annular form and hook-shaped projections 16a are formed on the outer periphery of the chip guide member 16. Each hook-shaped projection 16a is disposed just in front of its respective tip 13 so as to face the rake surface of the respective tip 13, leaving a slight gap therebetween. Therefore, chips generated by the cutting edges 13a, 13b are guided into a chip reservoir space R by the chip guide member 16.

A mounting hole 18 is coaxial with the tool body 11. A stem portion 19a of an arbor 1 9 is inserted into the mounting hole 18 from the smaller-diameter end (upper end as viewed in FIG. 2) of the tool body 11. A fastening bolt 20 is screwed into the stem 19a, thereby fixing the tool body 11 to the arbor 19.

A taper shank 19c is provided on the end of the arbor 19 opposite to the stem 19a. The taper shank 19c is chucked on a spindle S of a machine tool, thus the tool body 11 is fixed to the machine tool.

The stem 19a of the arbor 19 has a large-diameter journal portion 19b which is fixed to a bearing 21. A fixed part 22a of a chip receiver 22 (simply referred to as a "fixed part 22a") has an upper end portion that fits on the outer race of the bearing 21. The fixed part 22a is fixed by means of bolts 24 to a cover 23 that is secured to the outer race of the bearing 21, whereby relative rotation is allowed between the tool body 1 and the fixed part 22a about the axis of the tool body 11.

The chip receiver 22 also has a movable part 22b (simply referred to as a "movable part 22b") which also has a cylindrical form and which is telescopically received in the fixed portion 22a so as to be slidably adjustable up and down along the inner peripheral surface of the fixed-part 22a. The movable part 22b is secured by means of a bolt 25 to the fixed part 22a such that the end extremity of the movable part 22b is retracted axially inward (upward as viewed in FIG. 2) from a level of the cutting depth of the outer peripheral cutting edge 13b of the tip 13.

Figure 1:
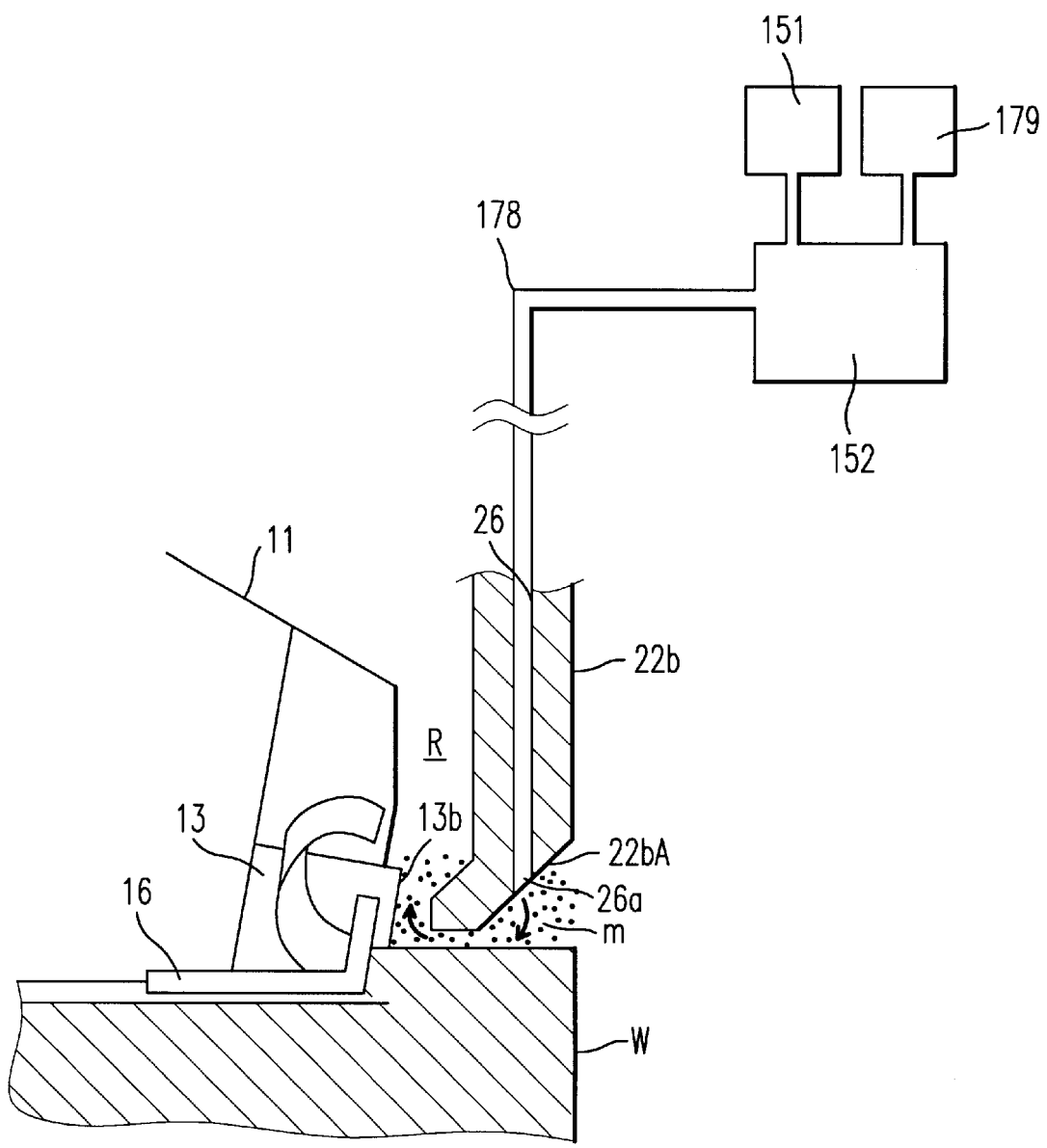
FIG. 1 is a sectional view of a face milling cutter in accordance with a first embodiment of the present invention, showing particularly a critical portion thereof.

As seen from FIG. 1, the diameter of the movable part 22b becomes progressively smaller at its lower end, so that the diameter of the inner peripheral surface of the movable part 22b is slightly greater than the circle formed by the locus of the outer peripheral cutting edge 13b. A plurality of oil passage bores 26 is formed in the wall of the movable part 22b so as to extend axially linearly, at a regular interval in the circumferential direction.

More specifically, the lower end portion of the movable part 22b is bent radially inward such that the inner and outer diameters progressively decrease towards the lower end extremity. Thus, the outer peripheral surface of the movable part 22 is tapered at the lower end portion 22bA in which discharge ports 26a of the oil passage bores 26 are provided.

Thus, the fixed part 22a and the movable part 22b in combination provide the chip receiver 22 which covers the tool body 11 and the outer peripheral cutting edges 13b, from the upper side of the tool body 11. The inner peripheral surface of the chip receiver 22 and the outer peripheral surface of the reduced-diameter portion of the tool body 11 define therebetween the chip reservoir space R to which chips are introduced via the tip pockets 15.

The chip receiver 22 is provided with a chip discharge opening 27 which penetrates the wall of the chip receiver 22. A connecting pipe 28 fits at its one end in the chip discharge opening 27.

A duct hose 29 has one end fitting on the other end of the connecting pipe 28 and another end that is connected to a suction device (not shown) for inducing air flow from the chip reservoir space R.

An oil mist m is generated by a mist generating device 152 which is connected to a cutting oil source 151 and an air source 179. Further, the mist generating device 152 is connected to the oil passage bores 26 via a hose 178. The mist generating device 152 atomizes a trace amount of cutting oil (preferably a vegetable oil) into uniform microfine particles in a well known method and mixes these particles with a large volume of air supplied by the air source 179, thereby forming the oil mist m that is eventually jetted from a mist outlet. Accordingly, the oil mist is generated by the mist generating device 152 in a well known method and then introduced into the oil passage bores 26 through the hose 178.

The oil mist m can flow even into tiny gaps and wet much greater surface area of an object to be cut than a cutting oil in liquid, thereby enhancing the cooling and lubricating effects. Furthermore, since only a trace amount of oil mist m is used, the quantity of wasted oil to be collected is significantly reduced.

In order that a workpiece w is milled by the face milling cutter having the described construction, the tool body 11 is chucked to a machine tool and then the workpiece w is fixed on a working platform such that the surface to be milled is normal to the axis of the spindle S of the machine tool.

Then, either the spindle S or the platform is moved in the axial direction of the spindle S so that the cutting tool comes in contact with the workpiece fixed on the platform. The cutting tool cuts into the surface of the workpiece w as either the spindle S or the platform moves while they remain perpendicular to each other.

Consequently, the surface of the workpiece w is cut by the face cutting edge 13a and the outer peripheral cutting edge 13b, as illustrated in FIG. 1.

The chips generated as a result of the cutting are introduced into the tip pockets 15 via the gap between the rake surface of the tip 13 and the end surface of the hooked projection 16a of the chip guide member 16 and further into the chip reservoir space R via the tip pockets 15. The chips are then sucked and collected into the suction device through the connecting pipe 28 and the duct hose 29.

The air pressure in the chip reservoir space R is reduced due to the effect of the swirl generated as a result of rotation of the tool body 11 and the effect of the suction generated by the suction device. Accordingly, the oil mist m discharged from the end of the chip receiver 22 is introduced into the inside of the chip receiver 22, so as to wet the surface of the work w, as well as the cutting edges 13a, 13b. Therefore, the better lubricating and cooling effects can be obtained.

Figure 4:
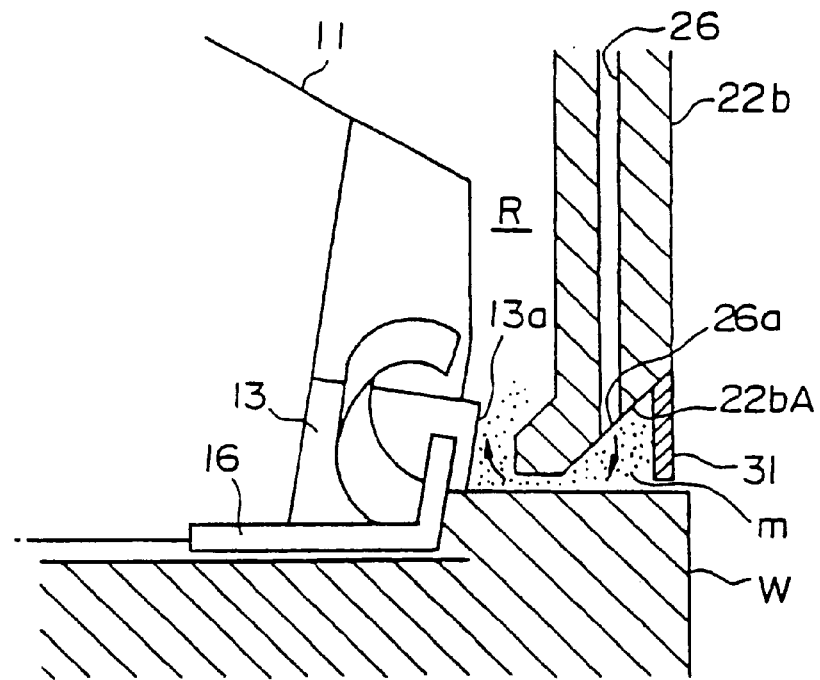
FIG. 4 is an enlarged sectional view of a critical portion of a modification of the face milling cutter shown in FIG. 1.

A description will now be given of a modification of the face milling cutter, with specific reference to FIG. 4. In this Figure, the same or equivalent parts as those in the first embodiment are designated by the same reference numerals and the descriptions of such parts are omitted.

This modification features an annular anti-scattering member 31 attached to the outer peripheral surface 22bA of the chip receiver 22 (specifically the lower end of the movable part 22b). The anti-scattering member 31 is attached on the peripheral surface 22bA and located further away from the tool body 11 than the oil discharge ports 26a; as a result, the outer peripheral surface of the movable part 22b is extended in the axial direction of the tool body 11 (downward as viewed in FIG. 4).

Thus, the described modification of the face milling cutter employs the anti-scattering member 31 that extends along the outer peripheral surface of the movable part 22b so as to cover the discharge ports 26a. The anti-scattering member 31 effectively prevents the oil mist m from scattering radially outward, even when the discharged oil mist m tends to spread conically from the oil discharging ports 26a. Further, the anti-scattering member ensures a sufficiently large rate of supply of the mist to the workpiece surface and the cutting edges 13a, 13b.

In the described modification of the first embodiment, the anti-scattering member 31 is formed as a separate member from the movable part 22 and then fixed to the latter by means of welding, bolts or the like. This, however, is only illustrative and the anti-scattering member 31 may be formed as an integral part of the movable member 22b. The annular form of the anti-scattering member 31 also is illustrative, and the anti-scattering member 31 may be substituted by a plurality of arcuate baffle plates that are arranged at positions corresponding to the positions of the oil discharge ports 26a.

Although a cutting oil is specifically used in the above and following embodiments, other cutting fluids commonly used in machining may be used in place of the cutting oil. Similarly, a face milling cutter is an exemplary application of a cutting tool of the present invention; hence, other applications of the present invention are possible.

Figure 5:
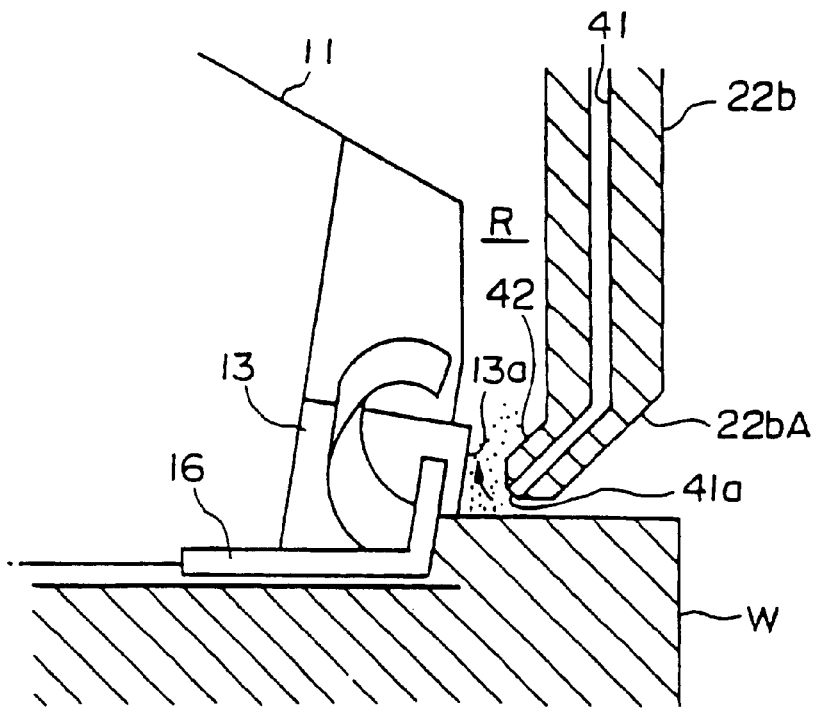
FIG. 5 is an enlarged sectional view of a critical portion of a face milling cutter in accordance with a second embodiment of the present invention.

A second embodiment of the present invention will now be described with reference to FIG. 5. In this Figure, the same or equivalent parts as those in the first embodiment are designated by the same reference numerals and the descriptions of such parts are omitted.

The face milling cutter of the second embodiment features the oil discharge ports 41a directed toward the tool body 11.

More specifically, in this embodiment, the oil passage bores 41 run through the movable parts 22b in the axial direction of the tool body 11. However, the oil passage bores 41 bend along the lower end portion 42 of the movable part 22b which bends toward the tool body 11. The oil discharge pores 41a is located at the end extremity of the lower end portion 42 of the movable part 22b.

In the face milling cutter of the second embodiment, the oil mist m is jetted at positions closer to the cutting edges 13a, 13b and the cut surface of a workpiece than that in the first embodiment. Thus, the face milling cutter discharges the oil mist m more efficiently and also facilitates a more effective suction of the excessive cutting oil.

Figure 6:
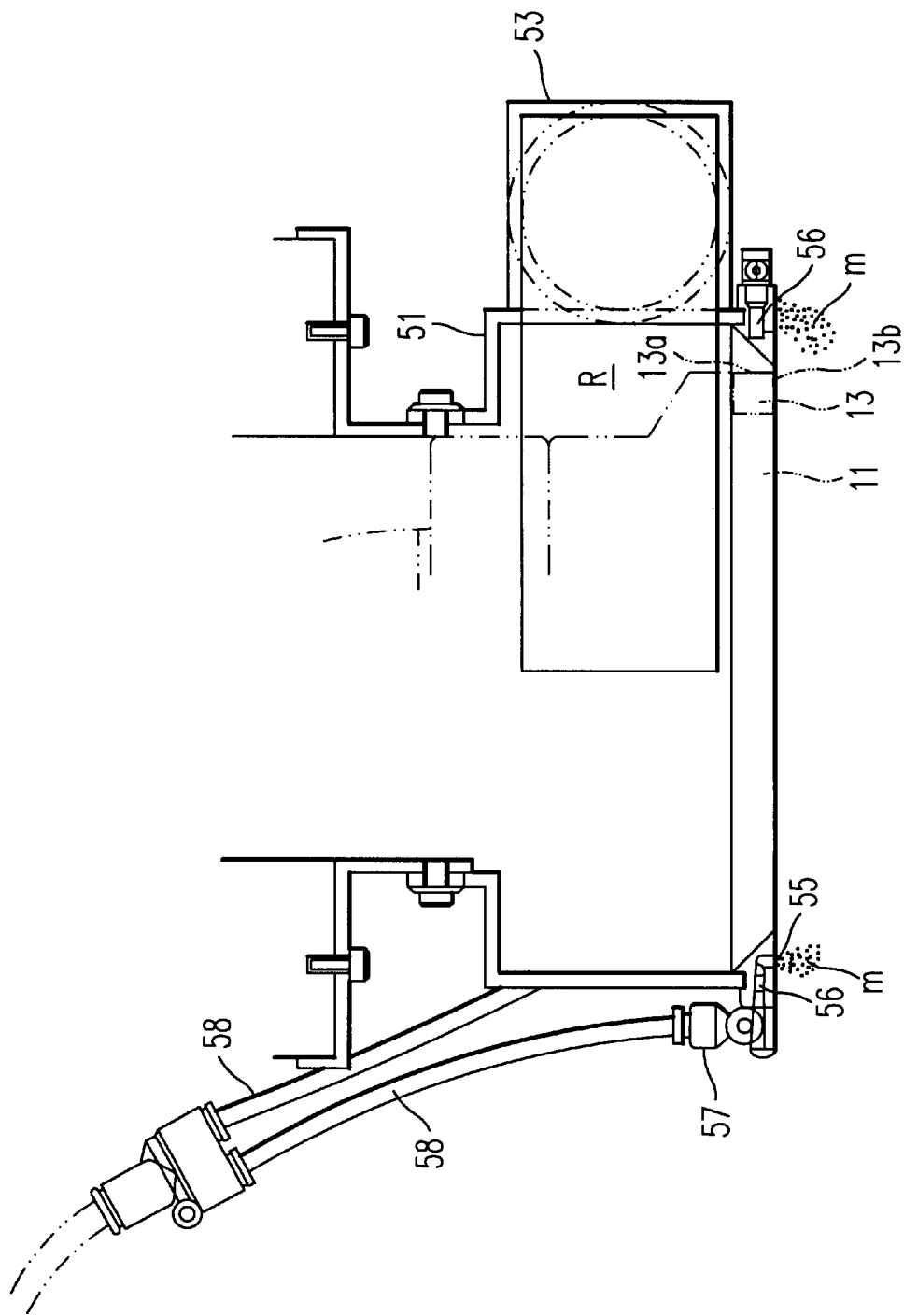
FIG. 6 is a sectional view of a face milling cutter in accordance with a third embodiment of the present invention.
Figure 7:
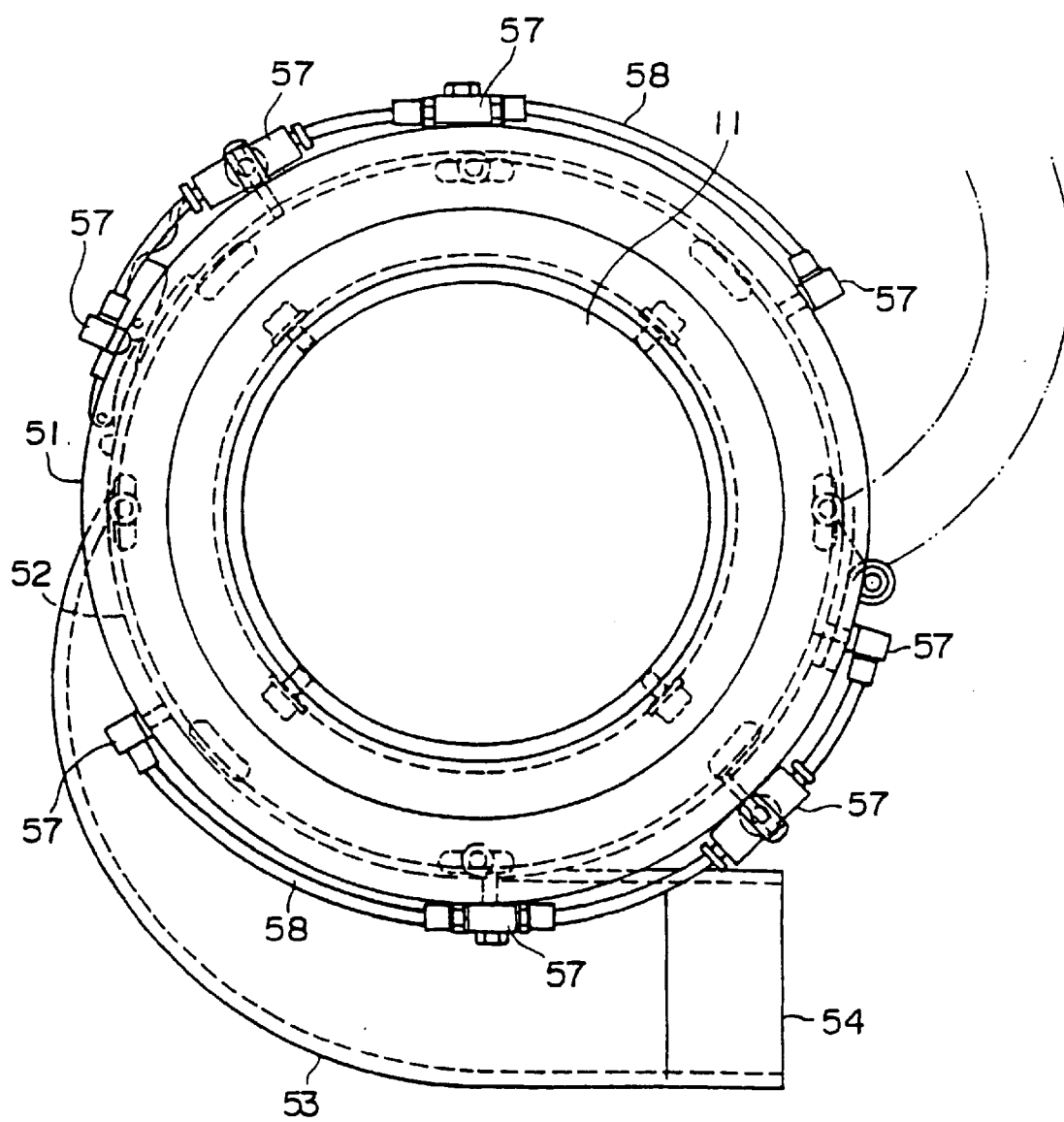
FIG. 7 is a plan view of the face milling cutter shown in FIG. 6.

A third embodiment of the present invention will now be described with reference to FIGS. 6 and 7. In these Figures, the same or equivalent parts as those in the previous embodiments are designated by the same reference numerals and the descriptions of such parts are omitted.

The face milling cutter of this embodiment features a cover 51 provided around the tool body 11 such that the tool body 11 is rotatable relative to the cover 51. A chip reservoir space R is formed between the inner peripheral surface of the cover 51 and the outer peripheral surface of the tool body 11 A discharge opening 52 communicating with the chip reservoir space R is formed in the cover 51. In addition, an auxiliary chamber 53 is provided so as to communicate with the discharge opening 52. The auxiliary chamber 53 is formed to expand progressively outward in the radial direction of the tool body 11 along the circumference of the cover 51. The auxiliary chamber 53 has an open end which serves as a chip outlet 54.

A plurality of oil passage bores 55, each having a substantially L-shaped section, is formed at an end portion of the cover 51 around its circumference at a certain pitch and opens at the outer peripheral surface and axial end surface of the cover 51. In the illustrated embodiment, there are eight such oil passage bores. A nozzle 56 is inserted into each oil passage bore 55. The nozzles 56 are connected to hoses 58 via connecting members 57. Accordingly, an oil mist m is supplied to the nozzles 56 via the hoses 58.

In operation of the face milling cutter of the illustrated embodiment, chips generated by the cutting edges 13a, 13b and introduced into the chip reservoir space R, are urged towards the inner peripheral surface of the cover 51 and are moved via the discharge opening 52 into the auxiliary chamber 53, and are finally discharged through the chip outlet 54.

The rotation of the tool body 11 creates a swirl that causes air to flow from the chip reservoir space R into the auxiliary chamber 53 and subsequently to be discharged from the chip outlet 54. Accordingly, a lower air pressure is maintained in the chip reservoir space R and the oil mist m discharged from the end of the cover 51 is drawn towards the inside of the cover 51. Thus the oil mist m is supplied to the surface of the workpiece w and the cutting edges 13a, 13b without being scattered, and affords the superior lubricating and cooling effects.

Figure 8:
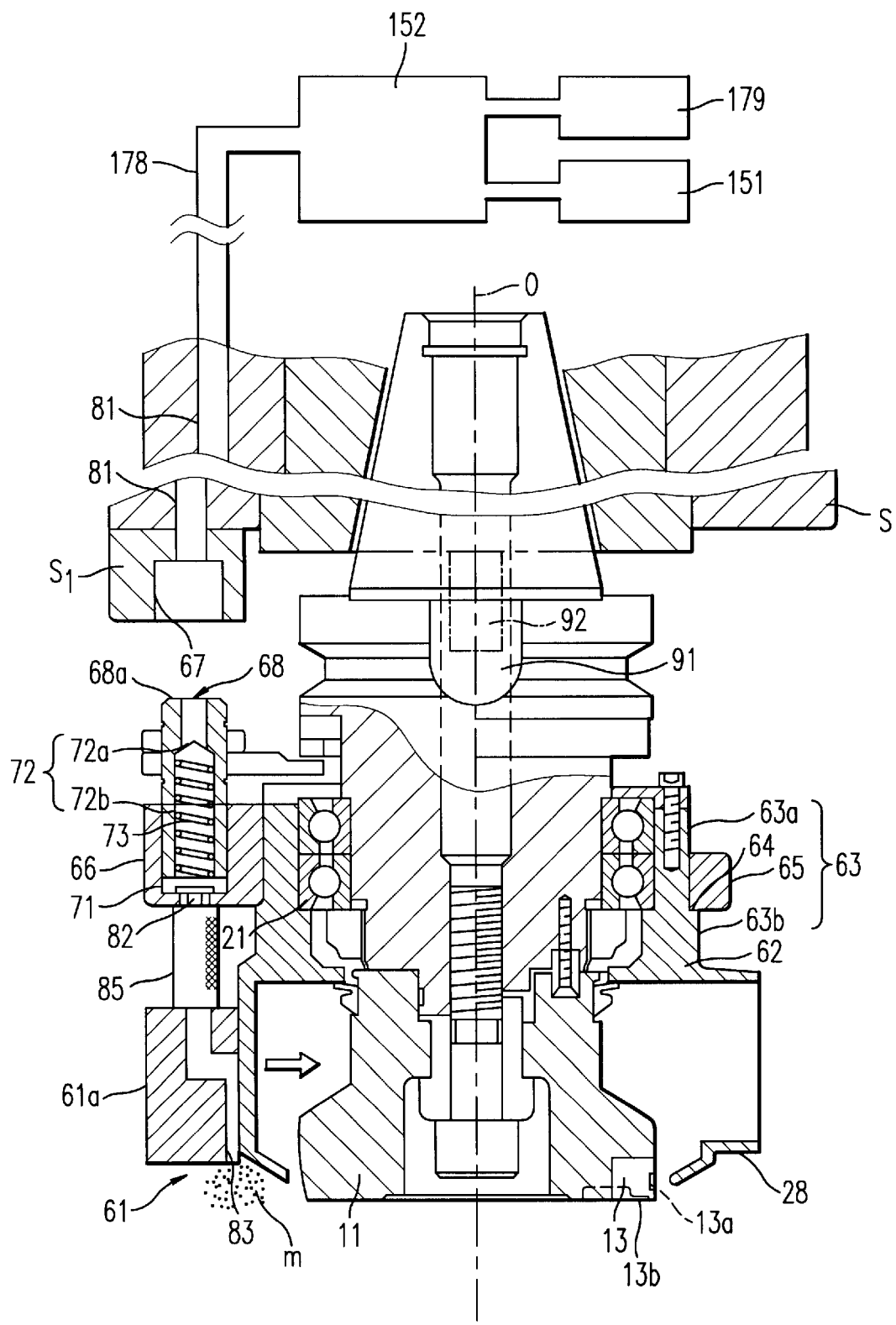
FIG. 8 is a sectional view of a face milling cutter in accordance with a fourth embodiment of the present invention.

A description will now be given of a fourth embodiment of the present invention, with specific reference to FIG. 8. In FIG. 8, the same or equivalent parts as those in the previous embodiments are designated by the same reference numerals and the descriptions of such parts are omitted.

The chip receiver 61 used in this embodiment has a base end portion 62 which is connected to the outer peripheral surface of the bearing 21. The base end portion 62 has a cylindrical surface whose axis coincides with the axis O of the tool body 11. The outer peripheral surface 63 has an upper peripheral surface portion 63a and a lower peripheral surface portion 63b. The upper peripheral surface portion 63a has an outside diameter slightly smaller than that of the lower peripheral surface portion 63b, whereby a step 64 is formed in the outer peripheral surface 63.

An annular block ring 65 is detachably fixed on the upper peripheral surface portion 63a. A part of the block ring 65 is expanded radially outward so as to provide an expanded portion 66 in which a locating pin (locating member) 68 is mounted. The locating pin 68 is engageable with a mating recess 67 formed in a spindle head S1.

More specifically, an insert hole 71 is formed in the expanded portion 66 and extends parallel to the axis O, so that the above-mentioned locating pin 68 can be inserted in and out of the hole 71. A through-hole 72 having a small diameter upper portion 72a and a large-diameter lower portion 72b is formed in the locating pin 68. A spring 73 is loaded between the bottom of the insertion hole 71 and the upper end of the large-diameter lower portion 72b in the locating pin 68.

A communication hole 81 is formed in the mating recess 67 of the spindle head S1 and communicates with the aforesaid mist generating device 152 via the hose 178, so that the oil mist m can be supplied from the mist generating device 152 which is connected to the cutting oil source 151 and the air source 179. Thus, the oil mist m flows into the through-hole 72 in the locating pin 68 when the locating pin 68 is connected to the mating recess 67. Another through-hole 82 is formed in the bottoms of the insertion hole 71 and expanded portion 66.

In this embodiment, the chip receiver 61 has an expanded portion 61a which is located diametrically across the connecting pipe 28. A hose 85 disposed between the expanded portion 61a and the expanded portion 66 of the block ring 65 provides a communication between the aforementioned through-hole 82 and an oil passage bore 83 formed in the expanded portion 61a.

The oil passage bore 83 has a base end portion that extends coaxially with the through-hole 72 and the hose 85, but turns toward the axis of the chip receiver 61 at a substantially mid portion, then turns again just before the outer peripheral surface of the chip receiver 61 and continues to extend along the outer peripheral surface of the chip receiver 61.

In the operation of the face milling cutter of this embodiment, the tool body 11 mounted on an arbor 19 is chucked on the spindle S of a machine tool by means of an automatic tool exchanging device, typically a machining center. To this end, the locating pin 68 is positioned so as to be aligned with the mating recess 67 in the spindle head S1. Subsequently, with the key 92 of the spindle S fitting in a keyway 91 formed in the arbor 19, the arbor 19 is fitted in the spindle S. At the same time, the end portion 68a of the locating pin 68 is received in the mating recess 67 of the spindle head S1.

Consequently, a complete oil passage includes the communication hole 81, through-hole 72, hose 85 and oil passage bore 83, whereby the oil mist m supplied by the mist generating device 152 is sprayed from the end of the chip receiver 61. Thus, the face milling cutter of this embodiment can be used without hampering the automatic operation of the automatic tool exchanging device, typically a machining center.

During the milling operation, air is discharged from the chip reservoir space R via the connecting pipe 28, by the effect of the swirl which is generated as a result of rotation of the tool body 11. Consequently, a reduced air pressure is maintained inside the chip reservoir space R, so that the oil mist m discharged from the end of the chip receiver 61 is effectively drawn towards the inner peripheral surface of the chip receiver 61. The oil mist m is therefore supplied to the surface of the workpiece w and the cutting edges 13a, 13b without being scattered. Thus, the excellent lubricating and cooling effects can be obtained.

Figure 9:
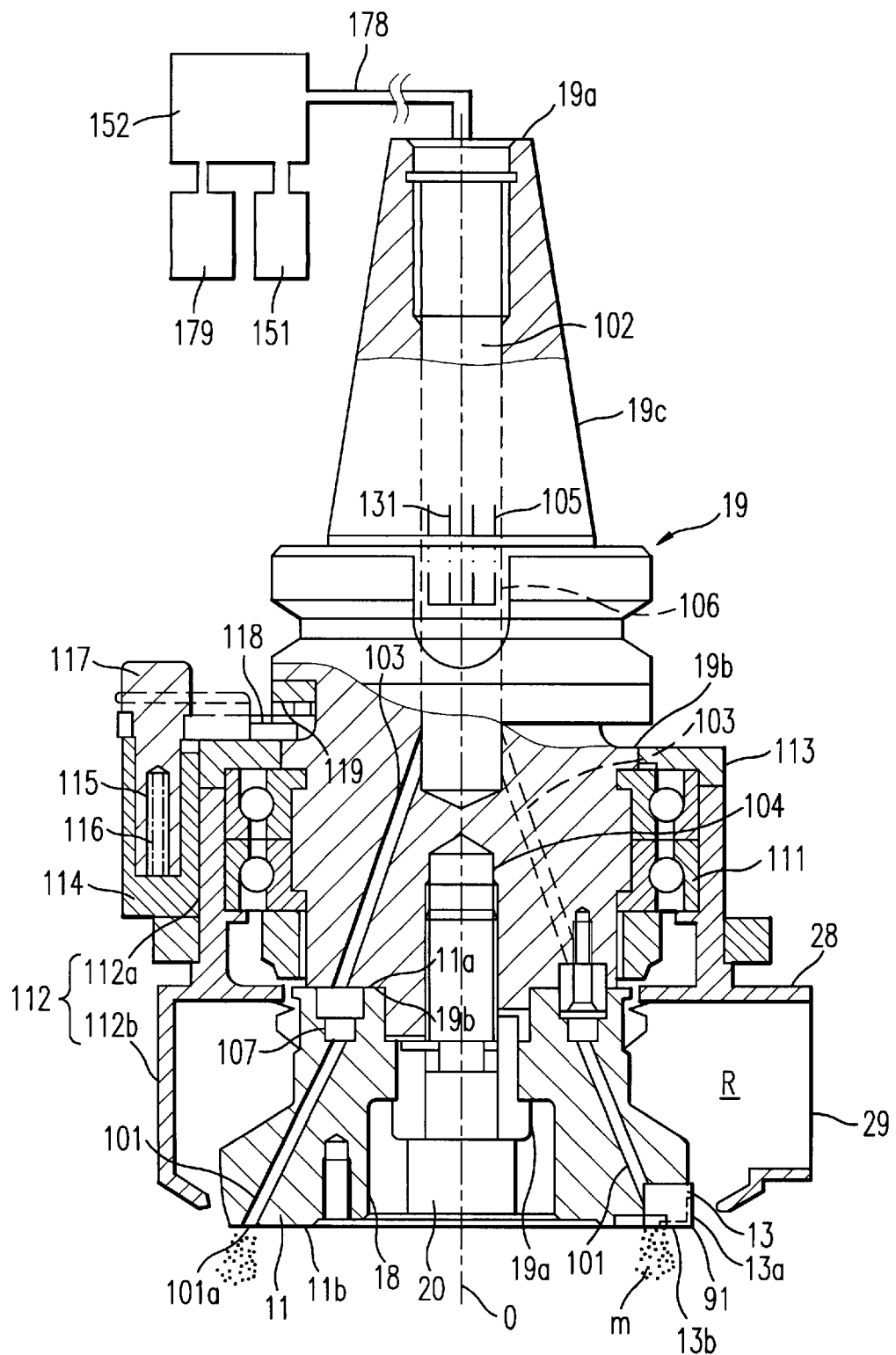
FIG. 9 is a sectional view of a face milling cutter in accordance with a fifth embodiment of the present invention.
Figure 10:
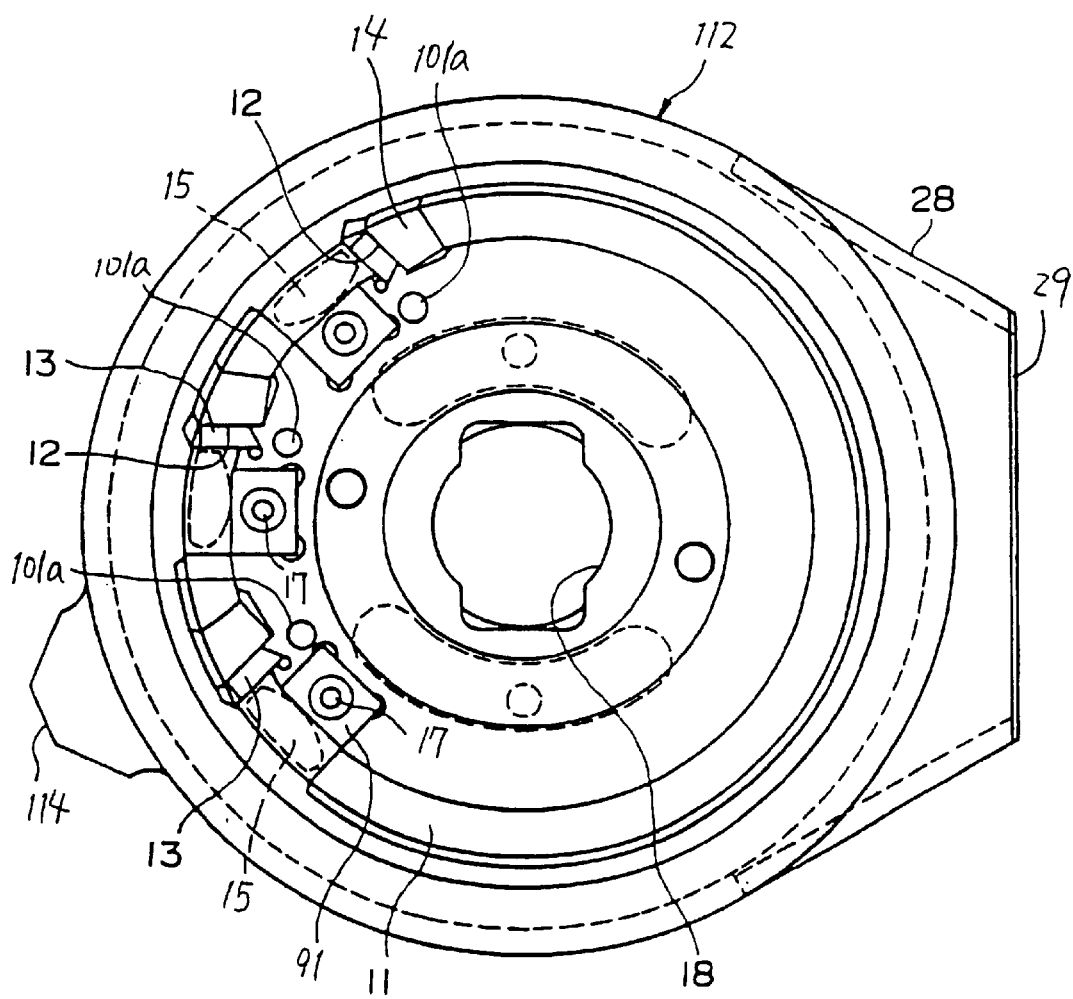
FIG. 10 is an end view of a face milling cutter shown in FIG. 9.

A description will now be given of a fifth embodiment of the present invention with reference to FIGS. 9 and 10. In these Figures, the same or equivalent parts as those in the previous embodiments are designated by the same reference numerals and the descriptions of such parts are omitted.

In this embodiment, a plurality of hook-shaped chip guide members 91 is disposed on the end of the tool body 11 around its circumference at a certain pitch and fixed thereto by means of countersunk screws 17. The tool body 11 is further provided with discharge bores 101 for discharging the oil mist m from the lower end thereof The discharge bores 101 are disposed at a suitable circumferential pitch. The number of the discharge bores 101 is equal to that of the tips 13. The discharge bores 101 extend from the base end face 11A towards the lower end 11B in a diverging manner so as to deviate progressively from the axis O. The passage bores 101 lead to the discharge openings 101a which open on the lower end surface 11B near the tips 13.

The arbor 19 has a spindle-receiving bore 102 formed therein so as to extend from the base end surface 19A toward the large-diameter journal portion 19b. The arbor 19 further has communication bores 103 that extend from an end of the spindle-receiving bore 102 so as to open on the end surface 19B of the large-diameter journal portion 19b.

The spindle receiving bore 102 extends to a position near the end of a threaded bore 104 into which the fastening bolt 20 is screwed. A spline 106, which is formed near a middle section of the spindle-receiving bore 102, engages with the spindle 105 of the machine tool so as to prevent relative rotation of the spindle 105.

As in the case of the discharge bores 101, the communication bores 103 of the same number as that of the tips 13 are formed inside the large-diameter journal portion 19b at a certain spacing and extend in a diverging manner to radiate progressively outward from the axis O to the end surface of 19B of the large diameter journal portion 19b. Each communicating bore 103 communicates with the respective discharge bore 103 via a stepped bore 107.

A bearing 111 is fixed to the large-diameter journal portion 19b of the arbor 19. A substantially cylindrical chip receiver 112 has an upper end portion 112a that fits on the outer race of the bearing 111. The upper end portion 112a is fixed by a bolt (not shown) to a cover 113 which in turn is fixed to the outer race of the bearing 111. Accordingly, the tool body 11 is allowed to rotate relatively with respect to the chip receiver 112 about the axis O.

The upper end portion 112a of the chip receiver 112 has a radially outwardly expanded portion 114 which has a mating bore 115 opening in the upper end surface of the expanded portion 114. A locating pin 117 is slidably received in the mating bore 115 with a compression spring loaded therebetween.

The locating pin 117 is provided with a locking portion 118 at its upper end portion. The locking portion 118 projects towards the axis O and engages with a recess 119 formed in the outer peripheral surface of the arbor 19. The arrangement is such that, when the arbor 19 is not mounted on a machine tool, the locating pin 117 is lifted by the force of the spring 116 as shown in FIG. 9, so as to cause the locking portion 118 to engage with the recess 119, thereby preventing relative rotation between the arbor 19 and the chip receiver 112.

A lower end part 112b of the chip receiver 112 extends along the axis O and surrounds the tool body 11 and outer peripheral cutting edges 13b; therefore, the inner peripheral surface of the lower end portion 112b and the outer peripheral surface of the tool body 11 define the chip reservoir space R. The end portion of the lower end part 112b is bent toward the tool body 11 close to the outer peripheral cutting edges 13b. The chip reservoir space R receives chips generated by the cutting edges 13a, 13b through the tip pockets 14.

A connecting pipe 28 is formed integrally to the lower end part 112b of the chip receiver 112 and communicates between the chip reservoir space R and the exterior of the chip receiver 112. The connecting pipe 28 has an open end which serves as a chip discharge opening 29; hence, the chips are expelled from the chip reservoir space R. A suction machine may be connected to the open end of the connection pipe 28 through, for example, a duct hose, in order to create air flow from the chip reservoir space R.

The spindle 105 has an axial central communication bore 131 extending along the axis O and opening at the lower end of the spindle 105. The communication bore 131 is designed to channel the oil mist m which is generated by the mist generating device 152. The oil mist m jetted from the discharge openings 101 is drawn into the chip reservoir space R due to the vacuum created by the suction machine and the rotation of the tool body 11, and is eventually expelled from the chip outlet 29 together with the chips.

In the state in which the arbor 19 has been mounted on the machine tool, the spindle 105 is in the spindle receiving bore 102 of the taper shank portion 19c and the locating pin 117 is in a mating recess formed in the machine tool. The locating pin 117 is pressed into the mating recess against the spring 116. In this state, the locking portion 118 is disengaged from the recess 119; therefore, the tool body 11 fixed to the arbor 19 is allowed to rotate while the chip receiver 112 is held stationary by the machine tool.

At the same time, the communication bore 131, spindle receiving bore 102, communication bores 103 and discharge bores 101 complete a passage for the oil mist m. Therefore, the oil mist m is generated by the mist generating device 152 which is connected to the cutting oil source 151 and the air source 179 and then discharged from the end of the tool body 11 through the hose 178 and the aforementioned passage.

The chips generated in the course of the cutting operation are collected in tip pockets 14 via the gaps formed between the rake surfaces of the tips 13 and the chip guide members 91, and are further introduced into the chip reservoir space R. The chips are then sucked and collected by the suction machine via the connection pipe 28, together with the oil mist m discharged from the discharge openings 101a.

In the face milling cutter of this embodiment, the oil mist m is supplied through the discharge passages 101 formed in the tool body 11 and is discharged from the discharge openings 101a which open at positions near the cutting edges 13a, 13b. Accordingly, the oil mist m is steadily supplied to the cutting edges 13a, 13b and the surface of the workpiece which is being machined, while any surplus oil mist is sucked and collected by the suction machine without being scattered to the environment. Therefore, excellent working performance is developed under a clean working environment.

Obviously, the third, fourth and fifth embodiments can have a suction machine connected to the connection pipe 28 via a duct hose 29 as in the case of the first embodiment, so that the suction of the oil mist m and the discharge of the chips are further promoted.

Chilled air of −30° C. to −40° C. may be directly jetted to a cooling object as the cutting medium in place of the oil mist m. It is also possible to form the oil mist by mixing a trace amount of cutting oil with such chilled air. Likewise, other gases commonly used in machining may be used in place of air. When these cutting media are used, the cost incurred for the disposal of the waste oil can be substantially reduced because the consumption of the oil is drastically reduced. In addition, working performance equivalent or superior to that realized with the use of liquid cutting oil can be achieved under a clean working environment.

A sixth embodiment of the present invention will now be described with specific reference to FIGS. 11 and 12. In these Figures, the same or equivalent parts as those in the previous embodiments are designated by the same reference numerals and the descriptions of such parts are omitted.

This embodiment is devoid of any passage bore 26 formed in the movable part 22b. Instead, a hose 141 is extended from the machine tool so as to be able to spray an oil mist m to a region near the end of the chip receiver 22. The aforesaid mist generating device 152 which is connected to the cutting oil source 151 and the air source 179 is also connected to the base end of the hose 141 via the hose 178. Thus, the oil mist m is supplied during the machining.

The machining employing an oil mist has the following problem. Since the oil mist is formed by mixing a trace amount of cutting oil in a large volume of air, it is impossible to recognize the oil mist visually. Thus, it is often extremely difficult to check whether the oil mist is adequately supplied during the machining or whether the oil mist is aimed at the target position. Consequently, it is difficult to confirm and direct the sprayed oil mist correctly to the target position.

The same problem is encountered also in the system that employs the chilled air as the cutting medium, because in such a system the chilled air of −30° C. to −40° C. is supplied directly or together with a small amount of cutting oil to form an oil mist.

Figure 11:
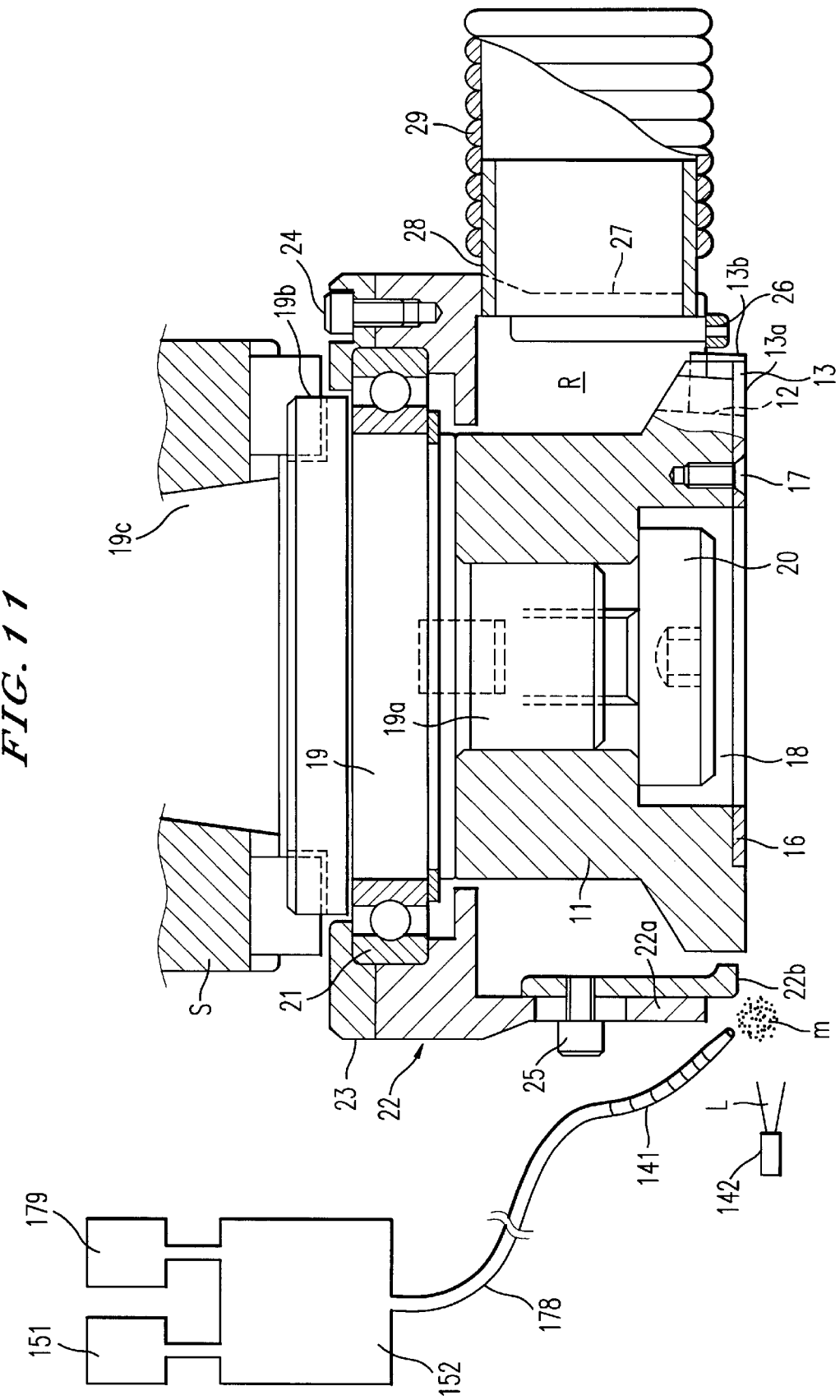
FIG. 11 is a sectional view of a critical portion of a face milling cutter in accordance with a sixth embodiment of the present invention.
Figure 12:
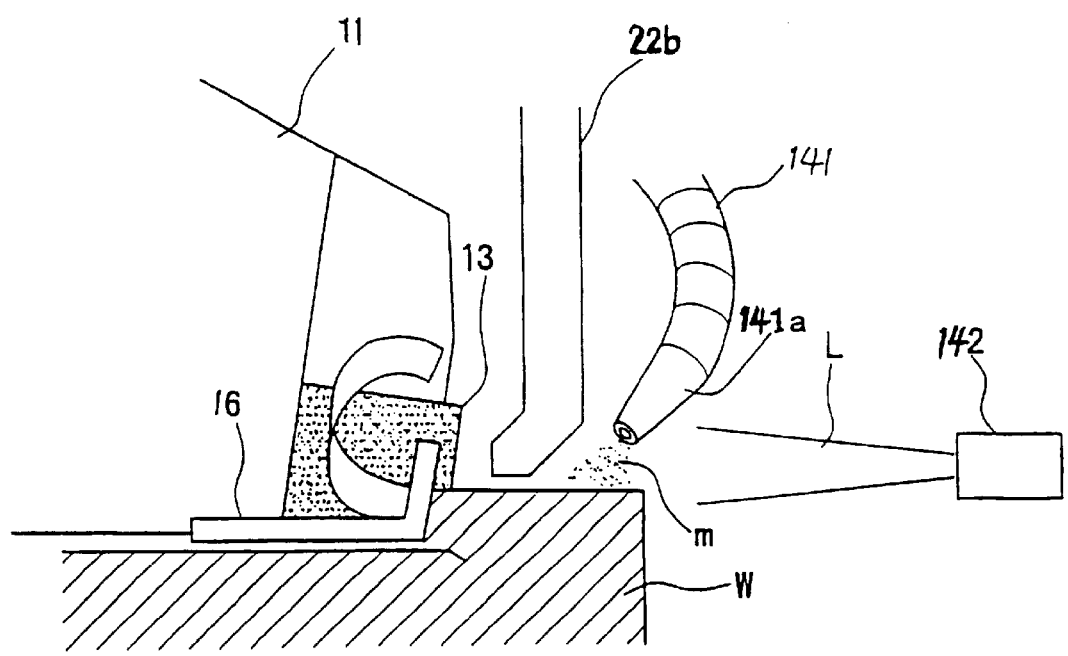
FIG. 12 is an enlarged view of a portion of the face milling cutter shown in FIG. 11.

In view of this problem, the face milling cutter of this embodiment employs, as shown in FIGS. 11 and 12, a light projecting device 142 serving as a visualizing mechanism that projects infrared rays or other light rays L to a predetermined area. Thus, the oil mist m jetted from nozzles 141a becomes visible. The light projecting device 142 turns on and off between light-emitting and non-emitting modes.

To mill a workpiece w by using the face milling cutter of this embodiment, a user sets the tool body 11 on the machine tool and fixes the workpiece w such that the surface of the workpiece lies normal to the axis of the spindle. Then, the nozzle 141a is aimed at the target area where the oil mist m will be jetted or an area near the end of the chip receiver 22. The nozzle 141a sprays the oil mist m while the light projecting device 142 projects the light rays L.

The light rays L impinging upon the oil mist is reflected randomly, so that the user can visually recognize the shot of the oil mist m. If the aim is deviated from the target region, the user can adjust the direction of the nozzle 141a so as to correct the locus of the oil mist m. The light projecting device is then turned off to stop the emission of the light rays L and thus the preparation for a cutting operation is completed.

Then, either the spindle or the working platform is moved along the axial direction of the spindle, thereby allowing the cutting tool to come in contact with the surface of the workpiece w. The cutting tool cuts into the surface of the workpiece w as the spindle or the working platform is moved while they remain perpendicular to each other. Consequently, the surface of the workpiece w is cut by the face cutting edge 13a and the outer peripheral cutting edge 13b.

The chips generated as a result of the cutting are temporarily collected into the tip pockets 15 after being guided through the gap between the rake surfaces of the tips 13 and the end surfaces of the hook-shaped projections 16a. Then, the chips are further hurled into the chip reservoir space R and finally, through the connection pipe 28 and duct hose 29, collected to the suction machine.

In this embodiment of the face milling cutter, the light projecting device is provided to project the light rays L to the sprayed oil mist m, so that the oil mist m is reflected in the light rays and becomes visible. As a result, the density as well as range of the sprayed oil mist m can be ascertained and that will facilitate the adjustment of the nozzle 141a prior to a cutting operation.

The light projection device is turned off during a cutting operation so that the operator can observe the cutting and will not be disturbed by the light rays which may be reflected otherwise.

A description will now be given of a seventh embodiment of the present invention, with specific reference to FIG. 13. In this Figure, the same or equivalent parts as those in the previous embodiments are designated by the same reference numerals and the descriptions of such parts are omitted.

This embodiment also employs a visualizing mechanism. In place of the light projecting device 142 used in the sixth embodiment, the seventh embodiment employs a coloring device which colors the cutting oil to enhance the visibility of the sprayed oil mist m.

Figure 13:
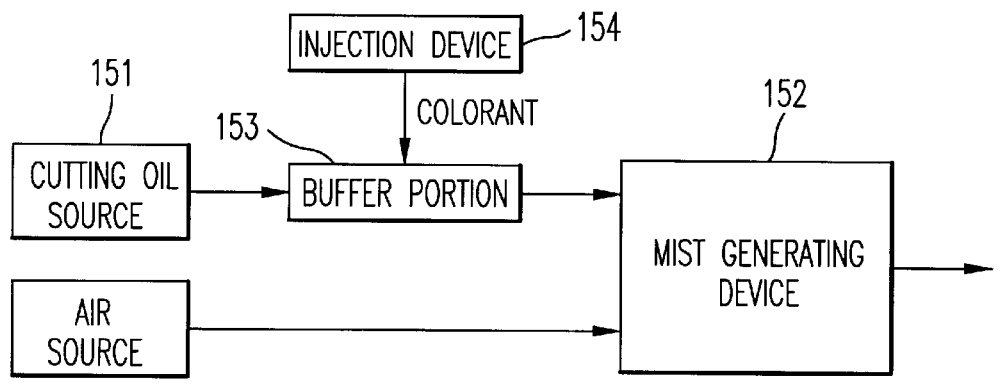
FIG. 13 is a block diagram illustrating a step of coloring a cutting oil by a visualizing mechanism employed in a seventh embodiment of the present invention.

More specifically, the visualizing mechanism employs, as shown in FIG. 13, a buffer portion 153 interposed between a source 151 of the cutting oil and the mist generating device 152, and a colorant injection device 154 which injects a colorant into the buffer portion 153. The buffer portion 153 is capable of reserving a predetermined amount of the cutting oil. The cutting oil stored in the buffer portion 153 is colored when the colorant is injected by the colorant injection device 154, and the cutting oil thus colored is sent to the mist generating device 152.

The colored cutting oil is atomized by the mist generating device 152 and is mixed with air to form a colored oil mist m that is discharged from the nozzle 141a. The density as well as range of the sprayed oil mist can be easily recognized because the oil mist m is colored.

The visualizing mechanism of this embodiment also serves to facilitate the position adjustment of the nozzle 141a prior to a cutting operation. When the cutting operation is started, the oil mist m can be discolored as the injection of the colorant into the buffer portion 153 is stopped. This eliminates the necessity of an additional step of washing the colorant away from the workpiece w after the cutting.

Figure 14:
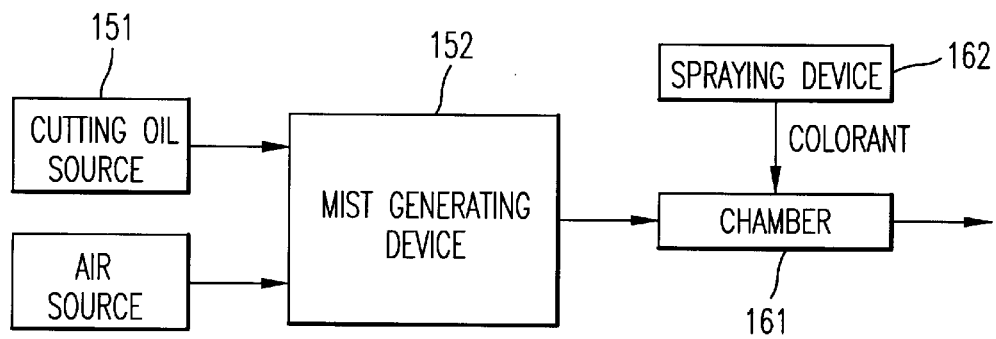
FIG. 14 is a block diagram illustrating a step of coloring a mixture of oil mist and air by a visualizing mechanism employed in an eighth embodiment of the present invention.

A description will now be given of an eighth embodiment, with specific reference to FIG. 14. In this Figure, the same or equivalent parts as those in the previous embodiments are designated by the same reference numerals and the descriptions of such parts are omitted.

This embodiment employs a visualizing mechanism that sprays an oil mist m together with an atomized colorant, thereby enhancing visibility of the oil mist m.

The visualizing mechanism includes a chamber 161 disposed downstream of the mist generating device 152, and a spraying device 162 that atomizes a mist of a colorant into the chamber 161. An oil mist m generated by the oil mist generator 152 is introduced into the chamber 161. At the same time, the mist of colorant is sprayed by the spraying device 162 into this chamber 161. Thus, the oil mist m and the mist of the colorant are mixed together. The mist mixture thus formed is sprayed from the nozzle 141a. Consequently, the mist of the colorant is sprayed together with the oil mist m, thus facilitating the visual recognition of the sprayed oil mist m.

The visualizing mechanism of this embodiment also facilitates the position adjustment of the nozzle 141a conducted prior to a cutting operation. During a cutting operation, uncolored oil mist m alone can be sprayed as the supply of the mist of the colorant into the chamber 161 is stopped. Hence, the necessity of the washing step is eliminated as in the case of the preceding embodiment.

Figure 15:
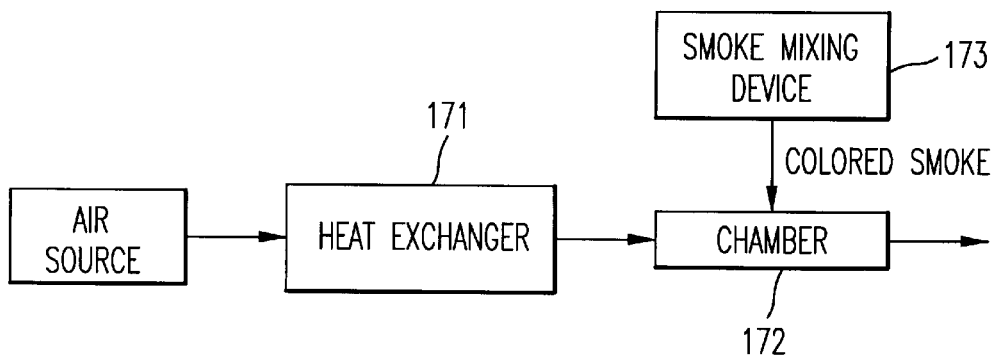
FIG. 15 is a block diagram illustrating a step of mixing a colored smoke in chilled air by a visualizing mechanism employed in a ninth embodiment of the present invention.
Figure 16:
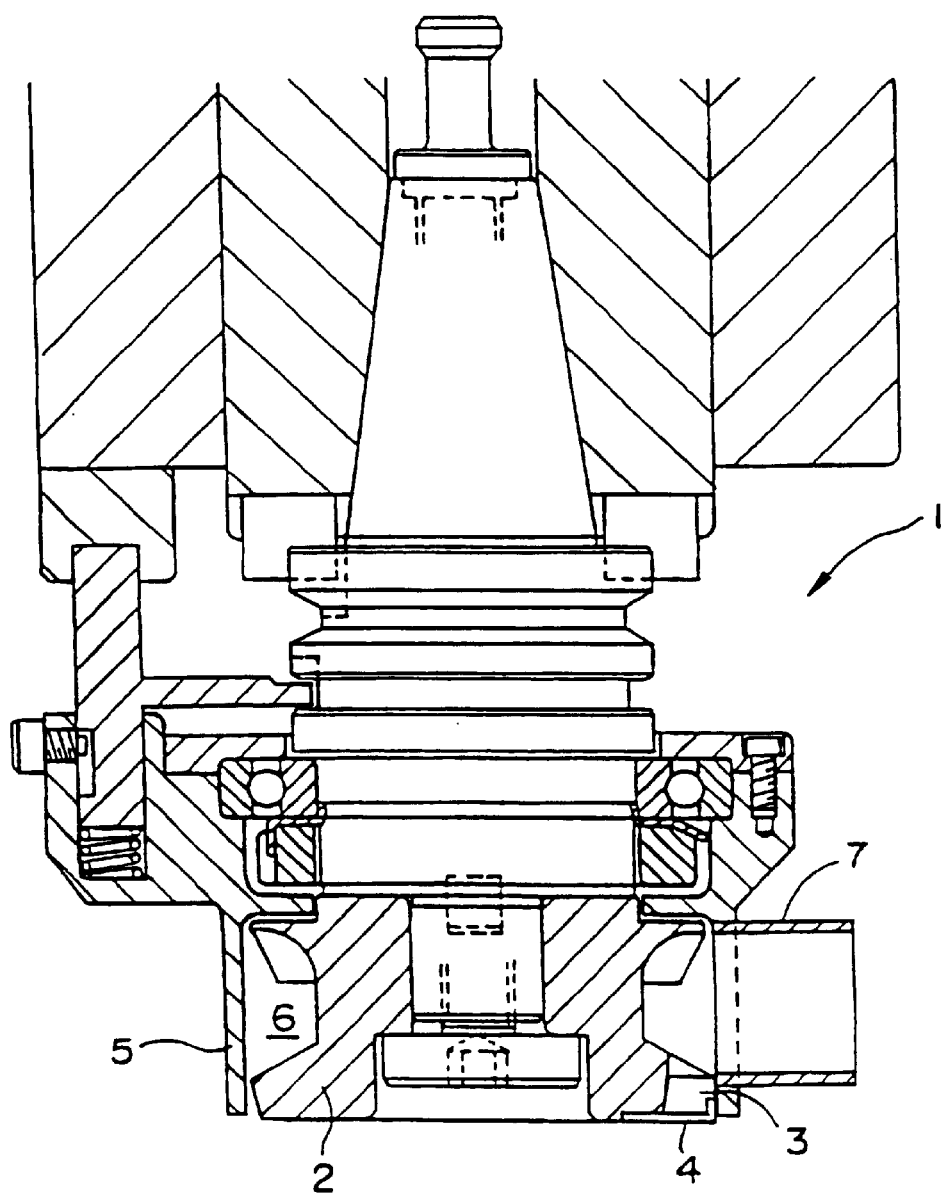
FIG. 16 is a sectional view of a conventional face milling cutter.

A ninth embodiment of the present invention will now be described with reference to FIG. 15.

Chilled air is used as the cutting medium in this embodiment. This embodiment employs a visualizing mechanism that makes the chilled air visible by mixing a colored smoke.

Air is supplied to a heat exchanger 171 and chilled through a heat exchange with a refrigerant such as liquid nitrogen. Thus, chilled air of $-30°$ C. to $-40°$ C. is obtained. The visualizing mechanism includes a chamber 172 disposed downstream of the heat exchanger 171 and a smoke mixing device 173 which generates a colored smoke and introduces the same into the chamber 172. The smoke mixing device 173 generates and sends a color smoke into the chamber 172. The chilled air and colored smoke flow into the chamber 172 and thus are mixed together. The mixture is discharged from the nozzle 141a, thus the density and range of the chilled air can be visually recognized without difficulty.

The visualizing mechanism of this embodiment also facilitates the adjustment of the nozzle 141a prior to a cutting operation. During a cutting operation, the smoke making device 173 stops sending a colored smoke into the chamber 161 so that chilled air alone can be sprayed. Therefore, the necessity of the washing step is eliminated as in the case of the preceding embodiment.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A cutting tool for a machine tool, comprising:
   a tool body having two end portions along an axis thereof, the tool body being configured to attach rotatably to the machine tool at one of said two end portions;
   at least one cutting edge provided on the other one of said two end portions and configured to mill a work;
   a cutting medium supplier configured to supply at least one of an atomized cutting fluid and a chilled gas to a place where the work is being milled by said at least one cutting edge; and
   a visualizing mechanism configured to make the at least one of an atomized cutting fluid and a chilled gas visible.

2. A cutting tool according to claim 1, further comprising:
   a chip receiver rotatably mounted to the tool body to cover an outer peripheral surface of the tool body and to form a space between an inner peripheral surface of said chip receiver and the outer peripheral surface of said tool body, said chip receiver having one end corresponding to the other one of said two end portion of the tool body, said chip receiver having a chip discharge opening and at least one discharge bore which has an opening at the one end of the chip receiver and through which the cutting fluid is discharged, chips generated by cutting the work by said at least one cutting edge being introduced into the space and discharged through the chip discharge opening.

3. A cutting tool according to claim 1, further comprising:

a chip receiver rotatably mounted to the tool body to cover an outer peripheral surface of the tool body and to form a space between an inner peripheral surface of said chip receiver and the outer peripheral surface of said tool body, said chip receiver having a chip discharge opening through which chips generated by milling the work and introduced into the space are discharged, said tool body having at least one discharge bore which has an opening from which at least one of an atomized cutting fluid and a chilled gas is discharged to the place where the work is being milled by said at least one cutting edge.

4. A cutting tool according to claim 2, wherein said chip receiver has a locating member engageable with the machine tool when said tool body is coupled to the machine tool, said locating member having a through-hole through which the at last one of an atomized cutting fluid and a chilled gas is supplied from the machine tool to said at least one discharge bore.

5. A cutting tool according to claim 2, wherein the opening of said at least one discharge bore is formed to be directed towards said tool body.

6. A cutting tool according to claim 2, further comprising:

an anti-scattering member extending towards the work and provided on the one end of the chip receiver radially outside the opening of said at least one discharge bore.

7. A cutting tool according to claim 1, wherein said visualizing mechanism comprises a coloring element configured to color the atomized cutting fluid.

8. A cutting tool according to claim 1, wherein said visualizing mechanism comprises a mixing element configured to mix a colorant with a mixture of mist of the atomized cutting fluid and air.

9. A cutting tool according to claim 1, wherein said visualizing mechanism comprises a light source configured to project light rays on the atomized cutting fluid.

10. A cutting tool according to claim 1, wherein said visualizing mechanism comprises a mixing element configured to mix a colored smoke and the chilled gas.

11. A cutting tool according to claim 1, wherein said visualizing mechanism comprises a switch configured to switch between an operative mode in which the visualizing mechanism is operated to make the at least one of an atomized cutting fluid and a chilled gas visible and an inoperative mode in which the visualizing mechanism is not operated.

12. A cutting tool according to claim 1, wherein said atomized cutting fluid comprises oil.

13. A cutting tool according to claim 1, wherein said chilled gas comprises air.

14. A cutting tool according to claim 1, wherein said cutting tool comprises a face milling cutter.

15. A cutting tool according to claim 1, wherein said cutting medium supplier comprises:

a cutting fluid supply source;

an air supply source; and a mist generator connected to the cutting fluid supply source and the air supply source, and configured to atomize cutting fluid supplied by the cutting fluid supply source and to mix the atomized cutting fluid with air supplied by the air supply source.

16. A method for supplying a cutting medium in a machine tool having at least one cutting edge, comprising the steps of:

providing a visualizing mechanism configured to make at least one of an atomized cutting fluid and a chilled gas visible;

supplying the at least one of an atomized cutting fluid and a chilled gas to a place where a work is being milled by the at least one cutting edge; and making the at least one of an atomized cutting fluid and a chilled gas visible.

17. A method according to claim 16, wherein:

said providing step comprises providing a coloring element configured to color the atomized cutting fluid; and said making step comprises coloring the atomized cutting fluid.

18. A method according to claim 16, wherein:

said providing step comprises providing a mixing element configured to mix a colorant with a mixture of mist of the atomized cutting fluid and air; and said making step comprises mixing the colorant a the mixture of mist of the atomized cutting fluid and air.

19. A method according to claim 16, wherein:

said providing step comprises providing a light source configured to project light rays on the at least one of ah atomized cutting fluid and a chilled gas; and said making step comprises projecting the light rays on the at least one of an atomized cutting fluid and a chilled gas.

20. A method according to claim 16, wherein:

said providing step comprises providing said visualizing mechanism comprises a mixing element configured to mix a colored smoke and the chilled gas; and said making step comprises mixing the colored smoke and the chilled gas.

21. A cutting tool for a machine tool, comprising:

a tool body having two end portions along an axis thereof, the tool body being configured to attach rotatably to the machine tool at one of said two end portions;

cutting means for cutting a work, said cutting means being provided on the other one of said two end portions;

supplying means for supplying at least one of an atomized cutting fluid and a chilled gas to a place where the work is being milled by said at least one cutting edge; and visualizing means for making the at least one of an atomized cutting fluid and a chilled gas visible.

* * * * *